APPARATUS AND METHOD FOR THE PRODUCTION OF METALLIZED MATERIALS

Filed Aug. 2, 1954

2 Sheets-Sheet 1

INVENTOR.
HERMAN R. NACK
HOWARD J. HOMER
JOHN R. WHITACRE

BY Toulmin & Toulmin

ATTORNEYS

Nov. 5, 1957 H. R. NACK ET AL 2,812,272

APPARATUS AND METHOD FOR THE PRODUCTION OF METALLIZED MATERIALS

Filed Aug. 2, 1954 2 Sheets-Sheet 2

INVENTOR.
HERMAN R. NACK
HOWARD J. HOMER
JOHN R. WHITACRE

BY Toulmin & Toulmin
ATTORNEYS

United States Patent Office 2,812,272

Patented Nov. 5, 1957

2,812,272

APPARATUS AND METHOD FOR THE PRODUCTION OF METALLIZED MATERIALS

Herman R. Nack, Troy, Howard J. Homer, Dayton, and John R. Whitacre, Liberty, Ohio, assignors to The Commonwealth Engineering Company of Ohio, Dayton, Ohio, a corporation of Ohio Application August 2, 1954, Serial No. 447,358

17 Claims. (Cl. 117—107)

This invention relates to apparatus and methods for the plating of material with metal deposited from the gaseous state by the decomposition of heat decomposable metal bearing compounds; more specifically the invention relates to the production of metallized insulating material in substantially continuous lengths.

In the deposition of metal from heat decomposable metal bearing compounds on heated materials a primary problem is the adequate heating of the insulating material; preferably the insulating material itself is the only component of the operation in contact with the plating gas, and this contact with the gas of course tends to cool the insulating material itself somewhat. With many insulating materials the temperature to which the same may be raised is limited by the nature of the material, and accordingly it is desirable to have means for metallizing a given insulating material at a desired temperature despite the tendency of the same to be cooled in the plating operation.

The problem is of particular importance where substantially continuous lengths of insulating material are to be plated at high speeds, as the application of the heat to the insulating material must be particularly efficient, or the metal will be cooled below that temperature at which effective decomposition of the heat decomposable metal bearing compounds takes place and inferior metallic coatings will result.

This invention particularly contemplates the provision of novel apparatus for the metallizing of insulating material in substantially continuous lengths, such for example, as continuous lengths of glass fibers. In this apparatus the insulating material is heated to the thermal decomposition point of a heat decomposable metal bearing gas by radiation, convection and conduction.

A primary object of the invention is the provision of compact apparatus which occupies a small spacing, is economical to produce, may be readily moved from one location to another to be used in metallizing, and which apparatus is yet particularly efficient for the deposition of metallic coatings.

An important object of the invention is the provision of apparatus in which the material to be plated is alternately heated and plated in the passage thereof through the apparatus.

A principal object of the invention is the provision in the apparatus of reflective means for concentrating heat upon a strand of material to assist the metallizing of the same and the maintaining thereof at the required degree of temperature for metallizing.

A further object of the invention is the provision of apparatus having heat reflective means cooperable with a source of heat to heat the continuously moving filaments, fibers or strands and to simultaneously support the same in their passage with a minimum of frictional effect.

The invention also contemplates the provision of a novel method for the metallizing of insulating materials, in which method heating of the material and plating thereof take place cyclically.

The invention will be more fully understood by reference to the following detailed description and accompanying drawings wherein.

Figures 1, 2, 3:
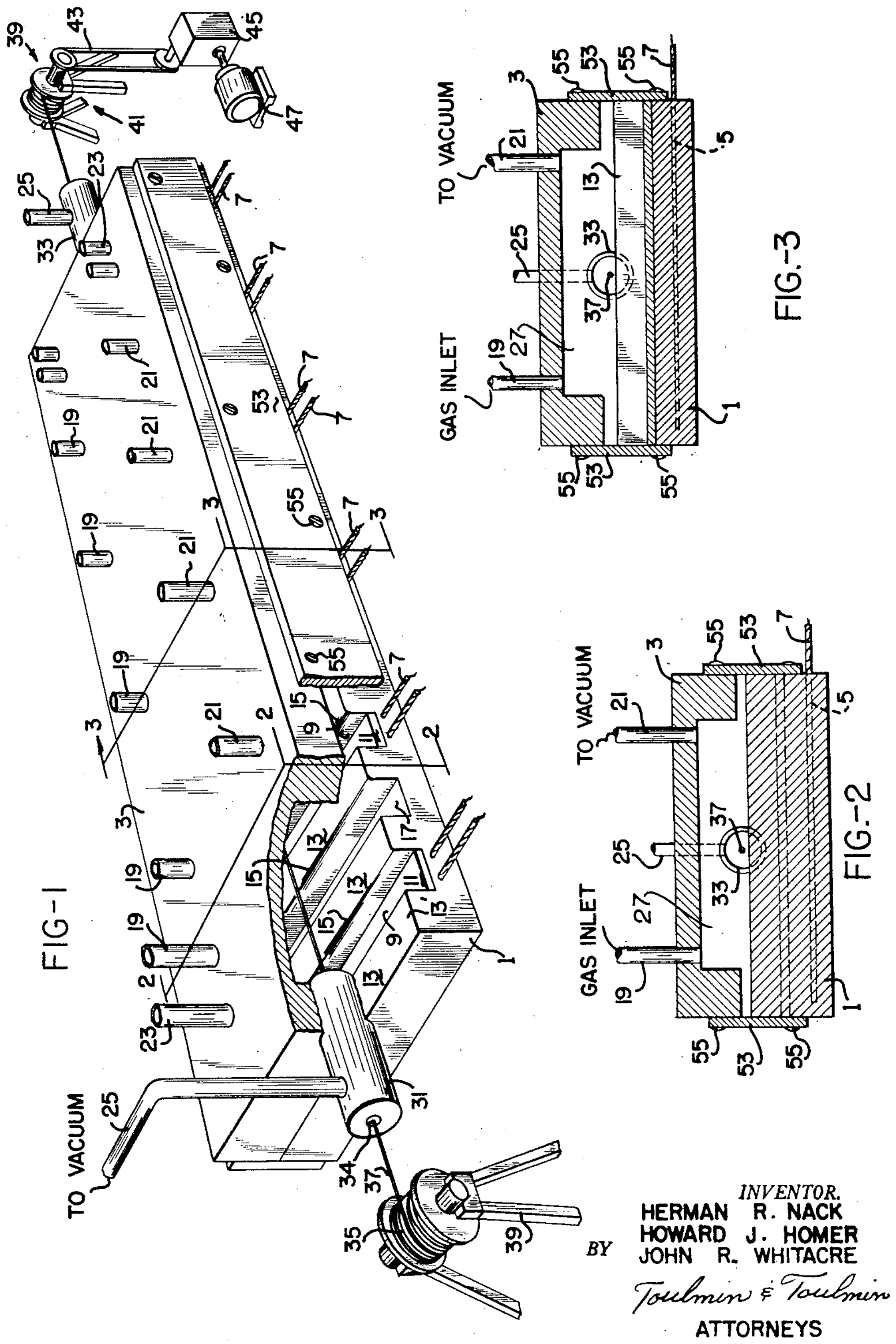
Figure 1 is a perspective view partially in section of the structure of invention in cooperable relation with a fiber strand which is to be metallized.
Figure 2 is a view taken on line 2—2 of Figure 1.
Figure 3 is a view taken on line 3—3 of Figure 1.

Referring to the drawings there is shown in Figures 1-3, inclusive, apparatus for the metallizing of continuous lengths of glass fibers. As shown in the drawings the apparatus comprises a lower body 1 of insulating material and an upper cover body 3 also of insulating material.

The lower body of insulating material is provided over the length thereof with a plurality of spaced induction heaters 5, each of which is separately supplied with energy through leads as at 7 from a source not shown. The coils of these induction heaters extend completely transversely of the body 1 and are preferably in intimate contact with the insulating material.

Opposite each set of induction heating coils the upper portion of the body 1 is slotted transversely therethrough as at 9. Each slot has provided therein a strip of metal 11 which is preferably of iron or other metallic material responsive to the field of the induction heating means to be heated thereby. Provision of the slots 9 forms transverse ridge portions 13 of the body 1 all of which are of the same height and which are rounded at their forward edges as at 15 to provide for the smooth passage thereover of a strand or filament of material being processed in the apparatus.

Slots 17, which are similar to slots 9 but which are not provided with metal, are positioned adjacent the ridges 13 on the right hand side thereof (Figure 1) and these slots provide a spacing in which the metallizing of the fibers or filaments passing through the apparatus is to take place. Thus opposite each of the slots 17 passing through the cover 3 there is shown as at 19 a conduit for the entry of plating gas to the spacing.

Referring briefly to Figure 2, it will be noted that the conduit 19 is positioned to one side of the longitudinal center line of the cover 3 and that an exhaust port 21 is positioned to the other side of the longitudinal center line and communicates with vacuum apparatus for the exhaustion of decomposed and other gases from the spacing.

Accordingly the gas which enters the conduit 19 flows transversely of the equipment, contacts the filament in its transverse movement and exits from the other side of the apparatus. The cover is also provided with inlet ports 23 and outlet ports 25 adjacent the ends of the cover for the passage of an inert gas, such as carbon dioxide, toward the end ridges 13, and this provides a gas seal at each end of the equipment through which material may be drawn readily.

In the assembled position shown most clearly in Figure 2, a channel 27 extends completely through the apparatus and this channel is formed by slotting out the cover 3 as indicated, and the channel communicates with the slots 9 and 17 and provides a narrow spacing above the ridges 13 for the passage through the apparatus of the material to be metallized. The inert gas, $CO_2$ for example, which is passed into the ends of the apparatus, enters this channel under pressure and flows outwardly of the apparatus at either end into conduits indicated at 31, 33, respectively, and accordingly the ends of the apparatus are gas sealed from the atmosphere, by flexible members 34 of the conduits apertured to permit passage of the material being metallized.

Referring now particularly to Figure 1 the apparatus is employed by providing a reel of glass fibers 35 in strand form as indicated at 37 and supporting the same on a suitable unreeling equipment indicated generally at 39, and the initial portion of the strand is led through the apparatus in any suitable manner to be secured on take-up reels indicated generally at 41, driven through belting 43 ang gear box and motor 45, 47, respectively.

The strand as it is pulled through by the action of the motor 47 is supported lightly in its passage by the ridges 13 and is heated by radiation particularly from the metal 11 which is itself heated by the induction coils. Thus the heated strand passes over the first leftward ridge 13 (as viewed in Figure 1) and over the slot 17 to which the plating gas has been supplied. The strand is heated sufficiently to effect the decomposition of gas and the deposition of metal thereon. The strand in its movement is then heated by the second of the metal ridges 11 and plated in the second of the slots 17. It is obvious that a great plurality of these slots and ridges may be provided within a very short spacing and that the strands 37 in their passage will be alternately heated and subjected to the metal bearing gases sequentially.

Figures 5, 6, 7:
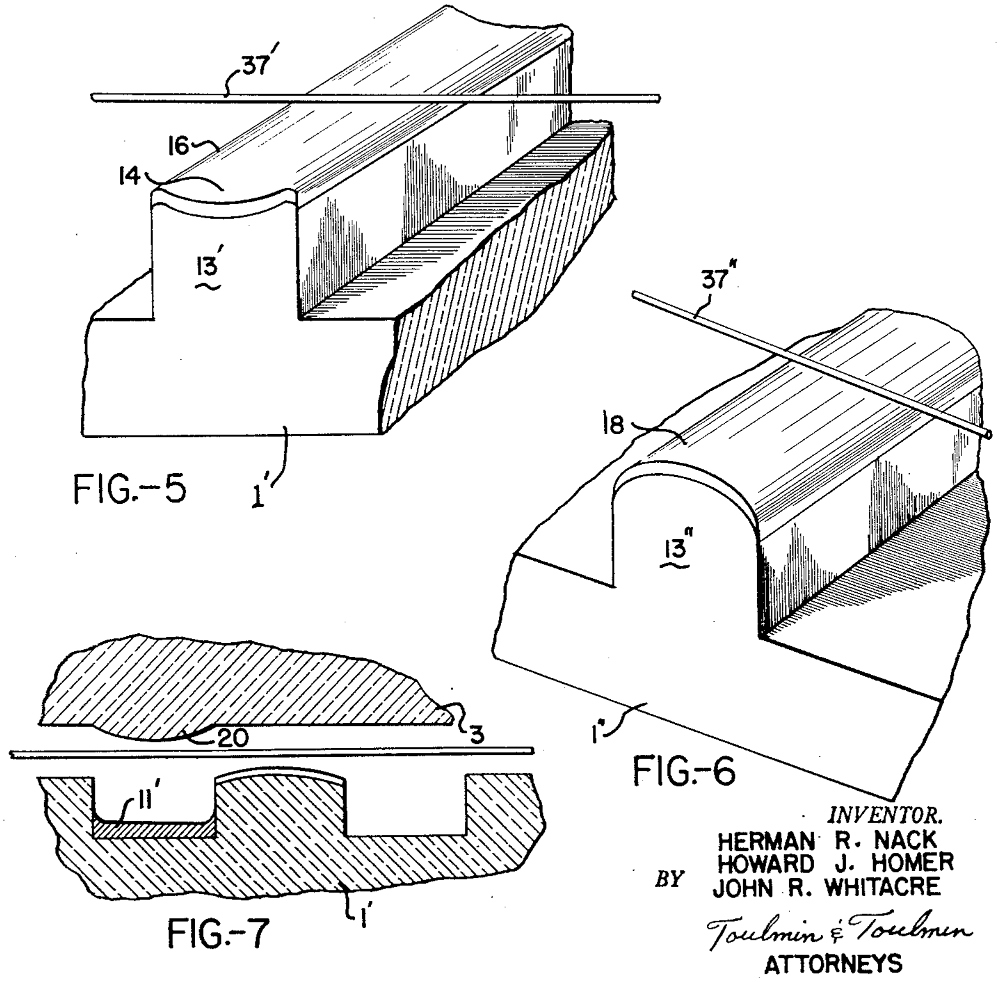
Figure 5 is a view partially in section illustrating a modification of a portion of the structure of Figure 1.
Figure 6 is a view similar to that of Figure 5 illustrating another embodiment of the invention.
Figure 7 is a fragmentary view in section of yet another embodiment of the invention.

Referring now to Figure 5 there is indicated at 13′ a ridge which is suitably provided with a metallized surface 14, the surface being relieved at the corners 16 to prevent abrasion of fibers passing thereover. The surface 14 is concave to the channel of the apparatus and reflects any heat which may be in the ridge 13′ of insulating material 1′, to the fiber.

Figure 6 illustrates a more effective arrangement of a ridge wherein the ridge 13″ of material 1″ is provided with a metallized surface 18 which is convex to the strand 37′ passing thereover, and accordingly this surface functions both to reflect heat from its mirror surface into the channel and to smoothly support the strand.

In the embodiment shown in Figure 7 the cover 3′ is provided on the upper portion of the channel with a member 20 which is concave to the channel and reflects heat received on the cover from the metal 11′ back to the strand, and further provides a smooth surface for the strand should whipping thereof take place in the material to any extent.

Figure 4:
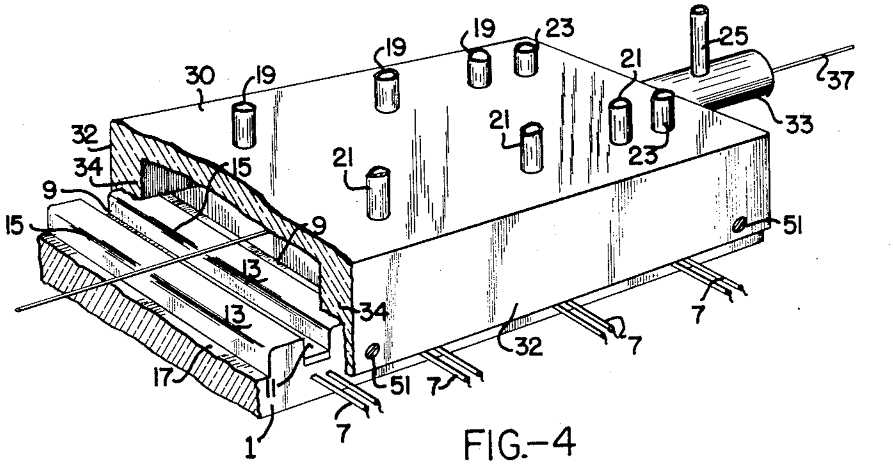
Figure 4 is a partial view in perspective of a further embodiment of the structure of invention.

Referring again to Figure 1 it is to be noted that the upper cover portion of insulating material and the lower body of insulating material may be retained together in any suitable manner, as for example, by screws passing through the cover and body as indicated at 51 in Figure 4.

In the structure shown in Figure 4 the cover has depending side flanges 32 which extend outwardly of the flanges 34. These flanges mate with the ridges 13 of the lower body 1 and are supported thereby, and the screws 51 are provided through the cover 30 and body 1 to retain the same in secure engagement for movement of the plating chamber as a unit if so desired. This structure is identical to that of Figure 1 except for the flange arrangement of the cover.

It is preferred, as in Figures 1–3, inclusive, to enclose the channels, to prevent the escape of plating gas, with longitudinally extending slabs 53 secured to the cover 3 and base 1 by bolts as at 55, as such structural arrangement requires less machine work on the insulating materials than does the structure of Figure 4.

The insulating materials useful in providing the structure of invention may suitably be a mica, a transite, or any material which retains the heat well.

The materials which may be employed in the structure of invention include not only glass fibers in the form of filaments, rovings, yarns, but also materials such as nylon, saran, orlon and dynal, for example. In this connection it is only necessary to regulate the heat supplied by the induction heaters in order to prevent softening of the material as it passes through the apparatus. Thus the glass temperature may be very high, but substantially any plating compound may be employed therewith. Nylon, however, may begin to soften at 320° F. and accordingly the body temperature of the nylon should not be permitted to exceed this amount or distortion will result. Similarly for orlon, the body temperature should not rise above about 450° F., while for the saran the body temperature should be maintained relatively low, that is about 360° F.

Due to the manner in which the heating cycle of the material takes place the skin temperature may rise above the temperatures set forth hereinbefore without material distortion of the filament strand or yarn. This is due to the fact that the material is heated only briefly and is then exposed to the plating gas, which tends to cool it as the gas decomposes. The repetitive heating and cooling does not deleteriously affect the product and in such instance has given rise to an increase in strength—in the case of nylon, for example, where orientation of the molecules probably results in the noted increase, which usually amounts to about 10–15 percent.

The heat decomposable compound should be selected to be decomposable at the skin temperature of the material passing through the apparatus. Such thermal decomposable metal bearing gases usually have a temperature range at which deposition takes place of a maximum rate and it is of course preferred to operate in such range. This may be accomplished by raising the skin temperature of the material as high as the skin will stand and then passing the plating gases through in voluminous quantity to effect rapid deposition.

The following examples illustrate the process of the metallizing of various fibers with the heat decomposable gaseous metal bearing compounds described:

*Example I*

Rovings of glass fibers are drawn through the apparatus described at a rate of about 50 feet per minute and are raised in temperature by the heat reflected from the elements 11 which are themselves at a temperature of about 600–625° F. Upon passing the first (leftward) metal plate 11 the fibers enter the first chamber 17 which is supplied with nickel carbonyl flowing transversely of the slot. When the gases strike the moving filaments the nickel deposits on the glass, and the exhaust gases together with any undecomposed gases pass out the exit 40 at 21 to vacuum.

This process is repeated, the temperature of each of the metal plates being identical, a deposit of metal builds on the glass fiber, in fact around each individual filament of the roving, and is effective not only to metallize each of the glass filaments but in addition serves as a lubricant between each of the glass filaments to prevent abrasion therebetween.

The pressure in the apparatus of the carbonyl is substantially atmospheric and air is excluded therefrom at the start of the operation, most suitably by flushing the apparatus out with carbon dioxide which passes through the chamber 23 to outlet 25 to vacuum. To attain the noted flushing action in the first instance it is usual to close off one end of the chamber and permit the carbon dioxide to flow out, for example, through the right hand end from the left hand end, thus cleaning the chamber of all gases.

The pressure within the chamber is not critical but is most suitably that of atmospheric in order that an optimum deposit of metal will occur.

A coating of nickel on the fibers of about 0.00002 of an inch is readily obtained when the slots 9 and slots 17 are each above ¾ of an inch wide, with about a ½ to ¾ inch ridge therebetween, the number of chambers being about five.

*Example II*

With the same chamber described in Example I, orlon fibers in filament form may be coated with iron deposited from iron carbonyl and in this intsance the temperature of the plates 11 may be about 500–525° F. throughout. The deposit of iron attained in the passage through a five-chamber arrangement, described in connection with Example I, is usually about 0.15 to 0.25 mils in one passage of the equipment, at a speed of about 75 feet per minute.

Other plating compounds which may be utilized are the carbonyls of chromium, molybdenum, tungsten, cobalt and mixed metallic carbonyls.

Illustrative compounds of other groups are the nitroxyls, such as copper nitroxyl; nitrosyl carbonyls, for example, cobalt nitrosyl carbonyl; hydrides, such as antimony hydride, tin hydride; metal alkyls, such as chromyl chloride; and carbonyl halogens, for example, osmium carbonyl bromide, ruthenium carbonyl chloride, and the like.

It is only necessary, in order to effect utilization of any of these compounds, to raise the speed of the particular filaments in accordance with the softening tendency thereof at the higher heat required for the thermal decomposition of these compounds.

The apparatus of invention is of particular utility due to its mobility, compactness and low cost construction, and to its capability for handling materials, such as saran, which have low softening points.

It will be understood that this invention is susceptible to modification in order to adapt it to different usages and conditions and accordingly, it is desired to comprehend such modifications within this invention as may fall within the scope of the appended claims.

We claim:

1. In apparatus for gas plating heat insulating material in continuous lengths, a body of insulating material having a channel therethrough, slots in said insulating material extending transversely to the channel, metallic members positioned in at least some of the slots which members are responsive to induction heating, means for introducing heat-decomposable plating gas into said channel, induction heating means disposed in the insulating material constructed and arranged for heating the metallic members, and means for moving the material being plated through said channel and transversely of said slots.

2. In apparatus for gas plating heat insulating material in continuous lengths, a body of insulating material having a channel therethrough, slots in said insulating material extending transversely to the channel, metallic members positioned in at least some of the slots which members are responsive to induction heating means for introducing heat-decomposable plating gas into said channel, induction heating means disposed in the insulating material constructed and arranged for heating the metallic members, said metallic members being in the form of strips extending transversely of the body and the channel, and means for moving the material being plated through said channel and transversely of said slots.

3. In apparatus for gas plating heat insulating material in continuous lengths, a body of insulating material having slots in said insulating material extending transversely thereof, said insulating material having a channel therethrough communicating with the slots and extending transversely of the slots, metallic members in alternate slots spaced apart by the insulating material bordering the channel, means for introducing heat-decomposable plating gas into said channel, and induction heating means disposed in said insulating material and adjacent said metallic members for heating said metallic members, and means for moving the material being plated through said channel and transversely of said slots.

4. In apparatus for gas plating heat insulating material in continuous lengths, the structure comprising an upper and lower body member of insulating material secured together and having a channel passing longitudinally therethrough, one of said bodies having longitudinal slots extending transversely of the channel and bordering the same, said insulating material which defines the transverse slots extending into contact with the other body and defining the channel therewith, means for introducing heat-decomposable plating gas into said channel, metallic members disposed in some of the transverse slots only, induction heating means positioned for heating the metallic members, and means for moving the material being plated through said channel and transversely of said slots.

5. In apparatus for gas plating heat insulating material in continuous lengths, a body of insulating material having transverse slots therethrough bounded by extending ridge portions of the insulating material, said body having a channel extending therethrough which is transverse to the slots bordering the same and the ridge portions, metallic members disposed in at least some of the slots, means for introducing heat-decomposable plating gas into said channel, induction heating means positioned adjacent thereto for heating said metallic members, and means for moving the material being plated through said channel and transversely of said slots.

6. In apparatus for gas plating heat insulating material in continuous lengths, a body of insulating material having transverse ridges defining transverse slots, said body having a channel extending therethrough transverse to the slots and communicable with the same and the ridge portions, metallic members disposed in at least some of the slots and which are responsive to means for introducing heat-decomposable plating gas into said channel, induction heating means positioned in the insulating material and arranged for heating said metallic members, and means for moving the material being plated through said channel and transversely of said slots.

7. In apparatus for gas plating heat insulating material in continuous lengths, a body of insulating material having transverse ridges defining transverse slots, said body having a channel extending therethrough transverse to the slots and communicable with the same and the ridge portions, metallic members disposed in at least some of the slots and which are responsive to induction heating means, means for introducing heat-decomposable plating gas into said channel, induction heating means in the insulating material and arranged for heating said metallic members, a mirror surface on at least some of the ridges and positioned to reflect heat to the channel, and means for moving the material being plated through said channel and transversely of said slots.

8. In apparatus for gas plating heat insulating material in continuous lengths, a body of insulating material having transverse ridges defining transverse slots, said body having a channel extending therethrough transverse to the slots and communicable with the same and the ridge portions, metallic members disposed in at least some of the slots and which are responsive to induction heating, means for introducing heat-decomposable plating gas into said channel, induction heating means positioned in the insulating material and arranged for heating of the metallic members, a mirror surface on ridge surfaces facing said slots, said mirror surface being convex to the channel.

9. In apparatus for gas plating heat insulating material in continuous lengths, a body of insulating material having transverse ridges defining transverse slots, said body having a channel extending therethrough transverse to the slots and communicable with the same and the ridge portions, metallic members disposed in at least some of the slots and which are responsive to induction heating, means for introducing heat-decomposable plating gas into said channel, induction heating means positioned in the insulating material and arranged for heating of the metallic members, and a mirror surface, the mirror surface being concave to the channel.

10. In apparatus for gas plating heat insulating material in continuous lengths, a body of insulating material having transverse ridges defining transverse slots, said body having a channel extending therethrough transverse to the slots and communicable with the same and the ridge portions, means for introducing heat-decomposable plating gas into said channel, metallic members disposed in alternate slots and heat reflecting means comprising a mirror surface on the opposite side of the channel from at least some of the metallic members, and induction heating means positioned in the insulating material and arranged for heating of the metallic members.

11. In apparatus for gas plating heat insulating material in continuous lengths, a body of insulating material having transverse ridges defining transverse slots, said body having a channel extending therethrough transverse to the slots and communicable with the same and the ridge portions, metallic members disposed in alternate slots, heat reflecting means comprising a convex mirror surface on the opposite side of the channel from at least some of the metallic members, means for introducing heat-decomposable plating gas into said channel, and induction heating means positioned in the insulating material and arranged for heating of the metallic members, and means for moving the material being plated through said channel and transversely of said slots.

12. In apparatus for gas plating, upper and lower bodies of insulating material secured together the lower body having a plurality of transverse ridges defining transverse slots and the bodies having a channel extending longitudinally therethrough communicable with the slots and passing over the ridges, metallic members responsive to induction heating in alternate slots of the body and adapted to heat metallic portions through the channel, induction heating means in the insulating material of the lower body constructed and arranged to inductively heat the metallic members, and means communicable with channel portions bordering the others of the slots for the passage of plating gas thereinto.

13. Apparatus for gas plating comprising a body member of insulating material and a cover portion therefor secured thereto, the body member having a plurality of transverse ridges defining transverse slots thereof, the cover being grooved longitudinally to define with the body member a longitudinal channel over the ridges communicable with the slots, metallic members positioned in alternate slots of the body member, means to pass a plating gas into the others of the slots on one side of the channel, and induction heating means in the body member constructed and arranged to heat the metallic members, and means communicable with the channel and other slots to remove plating gas from the opposite side of the channel.

14. The method of metallizing insulating material of continuous length which comprises passing the material through heating and metallizing zones sequentially, raising the temperature of the moving material to the thermal decomposition temperature of a heat decomposable compound in said metallizing zone, said temperature being raised by reflecting heat thereto in the heating zone, and subjecting the material to a gaseous metal bearing compound while thus heated which decomposes at the temperature of the material in the metallizing zone to effect metallic deposition on the material.

15. The method of metallizing materials of continuous length in strand form which comprises passing the strands in substantially continuous lengths through a heating zone, reflecting heat thereto to raise the temperature thereof to that which effects decomposition of a heat decomposable metal bearing compound, and flowing the heat-decomposable gaseous metal bearing compound transversely to the moving heated strand and into contact with the same to effect thermal decomposition of metal on the strand.

16. The method of metallizing fibrous material which softens at relatively low temperatures which comprises moving the material in substantially continuous lengths through a zone in which heat is radiated to the strand in sufficient intensity to raise the temperature thereof, supporting the heated material in its passage, and exposing the heated moving material to a transverse flow of a gaseous metal bearing compound which decomposes at the temperature of the strand, and repetitively effecting the heating step and the metallizing step with fresh metal bearing gases, to produce a flexible material having a metal coating of the desired thickness.

17. The method of metallizing continuous lengths of material having a low coefficient of thermal conductivity which comprises the steps of moving the material therealong from a source of supply, subjecting the moving material to heat reflected from a metal surface disposed transversely of the directional movement of said material, said material being heated below the softening temperature and sufficiently high to decompose the heat-decomposable gaseous metal compound which decomposes at the temperature of said material to cause decomposition of said gaseous metal compound and deposition of metal upon said moving continuous length material.

References Cited in the file of this patent

UNITED STATES PATENTS

| | | |
|---|---|---|
| 1,362,367 | Talley | Dec. 14, 1920 |
| 2,344,138 | Drummond | Mar. 14, 1944 |
| 2,405,662 | McManus et al. | Aug. 13, 1946 |

FOREIGN PATENTS

| | | |
|---|---|---|
| 122,395 | Great Britain | Apr. 14, 1921 |